(12) United States Patent
Mori et al.

(10) Patent No.: US 8,077,246 B2
(45) Date of Patent: Dec. 13, 2011

(54) METHOD AND APPARATUS FOR CONTROLLING IMAGING DIRECTION AND MAGNIFICATION OF CAMERA

(75) Inventors: Katsuhiko Mori, Kawasaki (JP); Masakazu Matsugu, Yokohama (JP); Masami Kato, Sagamihara (JP); Yusuke Mitarai, Ohta-ku (JP); Yuji Kaneda, Kawasaki (JP); Hiroshi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1044 days.

(21) Appl. No.: 11/376,882

(22) Filed: Mar. 15, 2006

(65) Prior Publication Data

US 2006/0222354 A1 Oct. 5, 2006

(30) Foreign Application Priority Data

Mar. 31, 2005 (JP) ................................ 2005-104368

(51) Int. Cl.
*H04N 5/225* (2006.01)
(52) U.S. Cl. ........ 348/340; 348/342; 348/360; 348/361; 348/229.1; 348/357

(58) Field of Classification Search .................. 348/335, 348/340, 342, 360, 361, 229.1, 357; 396/429, 396/72, 544, 529
See application file for complete search history.

(56) References Cited

U.S. PATENT DOCUMENTS

| | | | | |
|---|---|---|---|---|
| 5,111,288 A | * | 5/1992 | Blackshear | 348/143 |
| 6,665,006 B1 | * | 12/2003 | Taguchi | 348/211.1 |
| 2002/0101530 A1 | * | 8/2002 | Pelletier | 348/333.02 |
| 2002/0191866 A1 | * | 12/2002 | Tanabe | 382/298 |

FOREIGN PATENT DOCUMENTS

JP 9-009231 A 1/1997
* cited by examiner

*Primary Examiner* — Yogesh Aggarwal

(57) ABSTRACT

At least one exemplary embodiment is directed to an imaging processing method where a plurality of images are picked up while an imaging direction of a camera is being changed. The images are combined into a composite image. A target region is specified within the composite image. An imaging direction and an imaging magnification for imaging an object included in the target region in a predetermined size are calculated based on a position and a size of the target region in the composite image and an imaging parameter set for the camera when the plurality of images are picked up. Accordingly, the imaging direction and the imaging magnification for imaging the object to be imaged can be set easily.

10 Claims, 12 Drawing Sheets

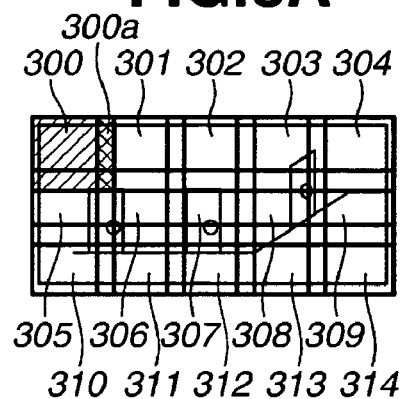 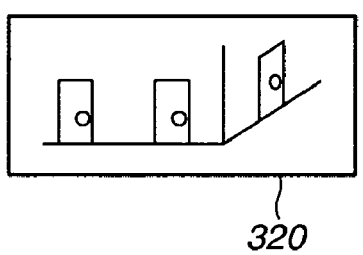 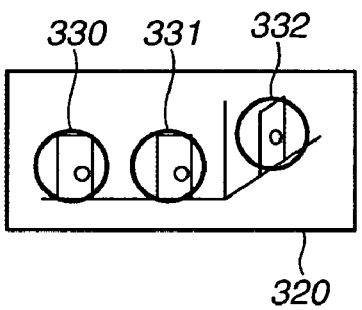
FIG. 3A  FIG. 3B  FIG. 3C
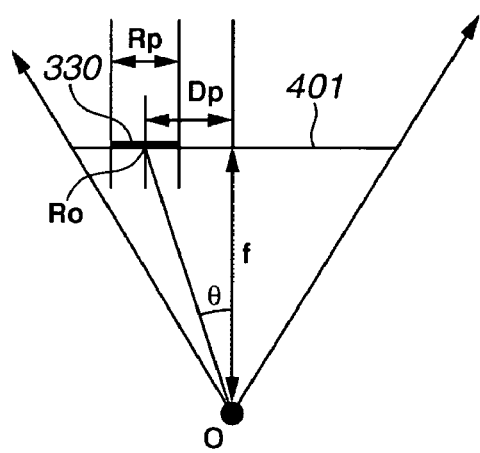
FIG. 4

FIG.8A  FIG.8B  FIG.8C
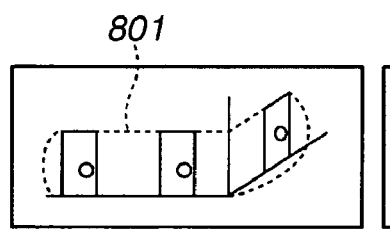
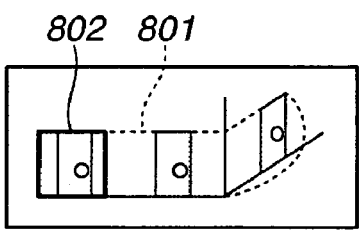
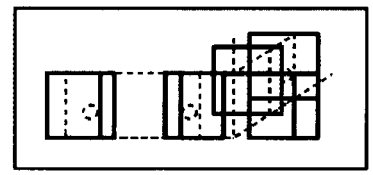

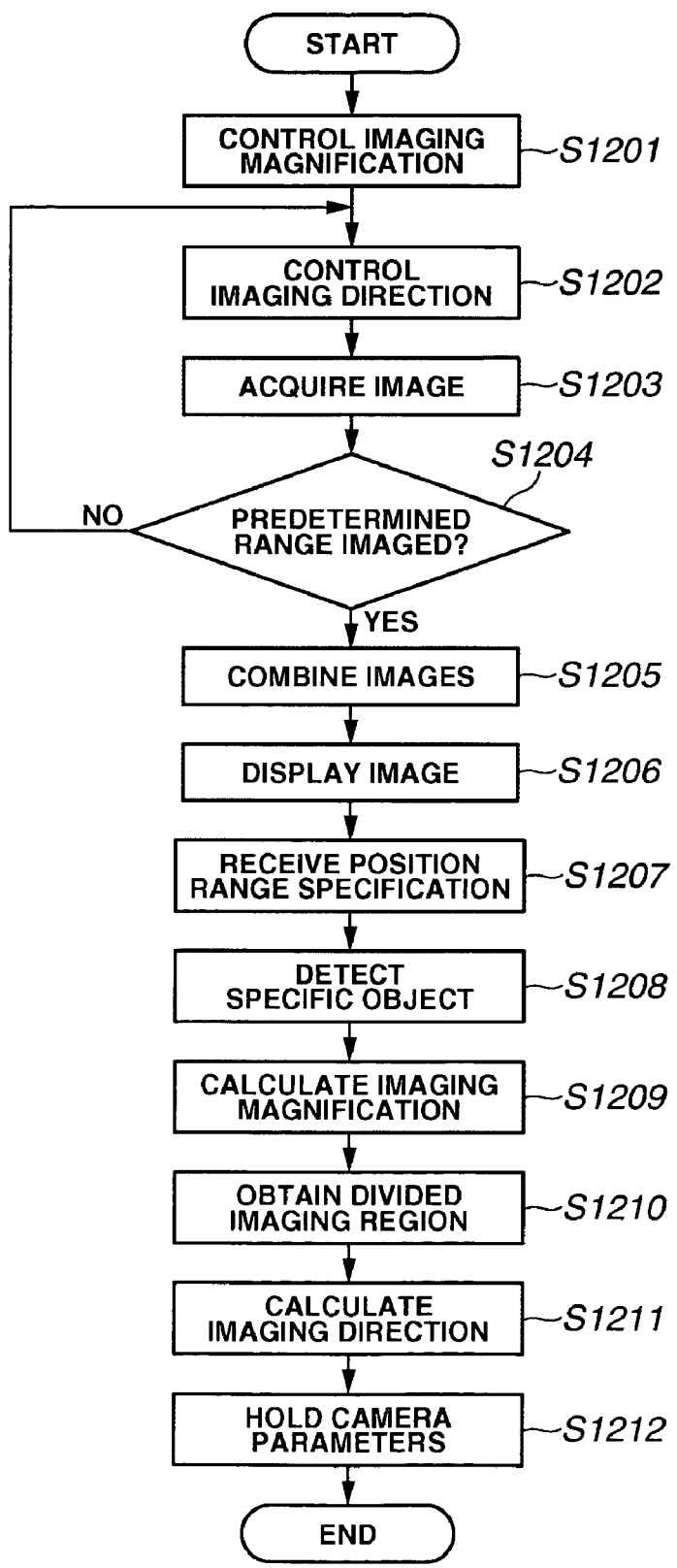

FIG.13A FIG.13B FIG.13C
 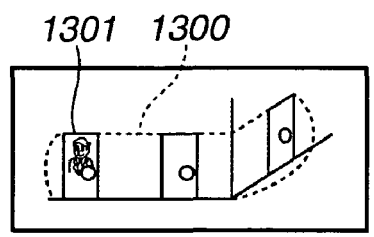 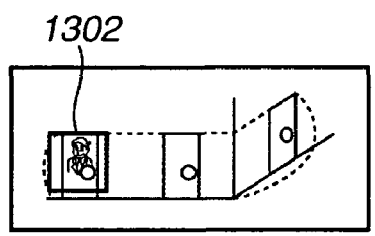
FIG.14
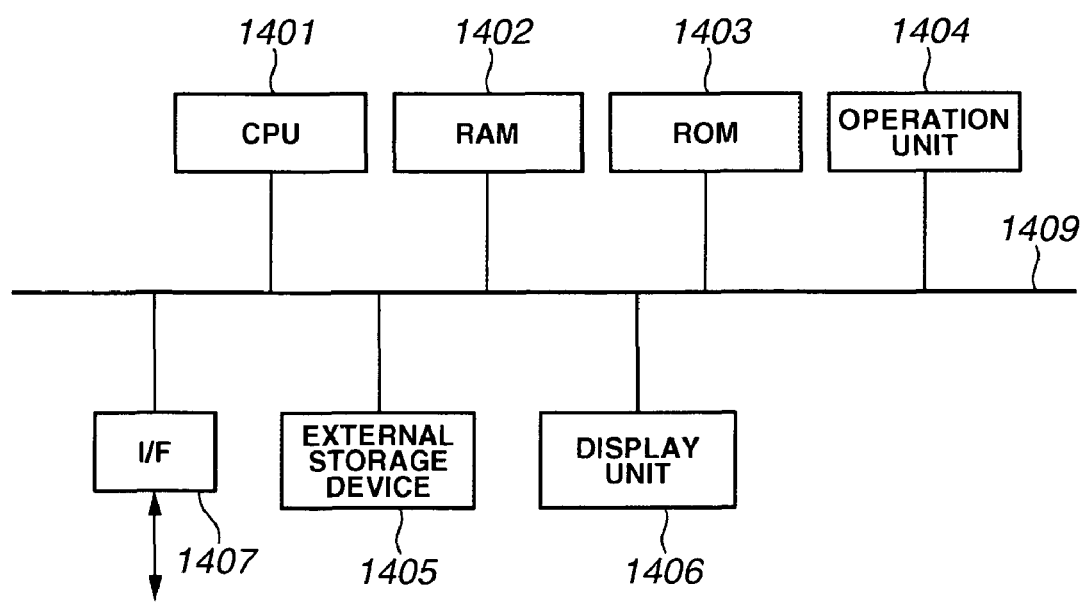

METHOD AND APPARATUS FOR CONTROLLING IMAGING DIRECTION AND MAGNIFICATION OF CAMERA

BACKGROUND OF THE INVENTION

1. Field of the Invention

The present invention relates to a technology for imaging with an appropriate imaging direction and an appropriate imaging magnification adopted in an imaging apparatus.

2. Description of the Related Art

An imaging apparatus is known which can image arbitrary regions by remotely controlling a changing of an imaging direction (i.e., panning or tilting) and a changing of an imaging magnification (i.e., zooming) of a camera via a network. Such a camera is used, for example, in a remote monitoring system or a videoconferencing system.

A conventional technique is discussed in regard to the controlling of panning, tilting, zooming of such a camera in which an image picked up by the camera and a GUI (Graphical User Interface) for controlling the camera are displayed on a display unit, and the controlling is performed using the GUI (e.g., see Japanese Patent Application Laid-Open No. 09-009231). Accordingly, the imaging direction and the imaging magnification of the camera can be adjusted by remote control so that a region desired to be viewed can be imaged.

The imaging direction and the imaging magnification of the camera can also be stored beforehand. For example, when a plurality of regions are desired to be imaged, the imaging direction or the imaging magnification does not need to be adjusted using the GUI for each imaging operation of the regions. Instead, the imaging direction and the imaging magnification of the camera stored beforehand can be called and set for the camera so that each of the regions can be imaged. Accordingly, the regions to be imaged can be changed easily.

However, in order to image a wide-range region, for example by a monitoring system, a large number of imaging directions and imaging magnifications need to be stored beforehand. When one range is to be divided into a plurality of regions to be imaged, it is not easy to set the divided regions to cover the whole range.

SUMMARY OF THE INVENTION

At least one exemplary embodiment is to facilitate setting an imaging direction and an imaging magnification for imaging an object to be imaged.

In at least one exemplary embodiment, an image processing method includes an imaging step of picking up a plurality of images while changing an imaging direction of a camera, a combining step of combining the plurality of images to form a composite image, a specifying step of specifying a target region within the composite image, and a calculating step of calculating an imaging direction and an imaging magnification for imaging an object included in the target region in a predetermined size, for example based on a position and a size of the target region in the composite image and an imaging parameter set for the camera when the plurality of images are picked up.

In at least one other exemplary embodiment, an image processing method includes an imaging step of picking up a plurality of images while changing an imaging direction of a camera, a combining step of combining the plurality of images to form a composite image, a specifying step of specifying a target region within the composite image, a dividing step of dividing the target region into a plurality of divided regions, and a calculating step of calculating imaging directions and an imaging magnification for imaging an object included in the divided regions in a predetermined size, for example based on positions and sizes of the divided regions in the composite image and an imaging parameter set for the camera when the plurality of images are picked up.

In yet at least one further exemplary embodiment, an image processing apparatus includes an imaging control unit adapted to pick up a plurality of images while changing an imaging direction of a camera, a composition unit adapted to combine the plurality of images to form a composite image, a specification unit adapted to specify a target region within the composite image, and a calculation unit adapted to calculate an imaging direction and an imaging magnification for imaging an object included in the target region in a predetermined size, for example based on a position and a size of the target region in the composite image and an imaging parameter set for the camera when the plurality of images are picked up.

In at least one exemplary embodiment, an image processing apparatus includes an imaging control unit adapted to pick up a plurality of images while changing an imaging direction of a camera, a composition unit adapted to combine the plurality of images to form a composite image, a specification unit adapted to specify a target region within the composite image, a division unit adapted to divide the target region into a plurality of divided regions, and a calculation unit adapted to calculate imaging directions and an imaging magnification for imaging an object included in the divided regions in a predetermined size, for example based on positions and sizes of the divided regions in the composite image and an imaging parameter set for the camera when the plurality of images are picked up.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification.

FIG. 3A is a diagram showing an image group acquired by changing an imaging direction.

FIG. 3B is a diagram showing a composite image combined from the image group.

FIG. 3C is a diagram showing regions specified in the composite image.

FIG. 4 is a diagram for explaining a process for calculating a direction in which an imaging unit is to be aimed to image the specified region.

FIG. 8A is a diagram showing an example in which a region that cannot be imaged at one time is specified in the composite image.

FIG. 8B is a diagram showing a region set within the specified region in FIG. 8A.

FIG. 8C is a diagram showing a result of dividing the specified region in FIG. 8A by the set region in FIG. 8B.

FIG. 12 is a flowchart showing a procedure for setting a region according to the third exemplary embodiment.

FIG. 13A is a diagram showing a human face as an example of a specific object.

FIG. 13B is a diagram showing a specific object detected within a specified region.

FIG. 13C is a diagram showing a region that can be imaged at one time with an imaging magnification set such that the detected object can be imaged in a predetermined size.

FIG. 14 is a block diagram showing a hardware configuration of a computer that realizes systems according to at lest one exemplary embodiments.

DETAILED DESCRIPTION OF THE EMBODIMENTS

Figure 1:
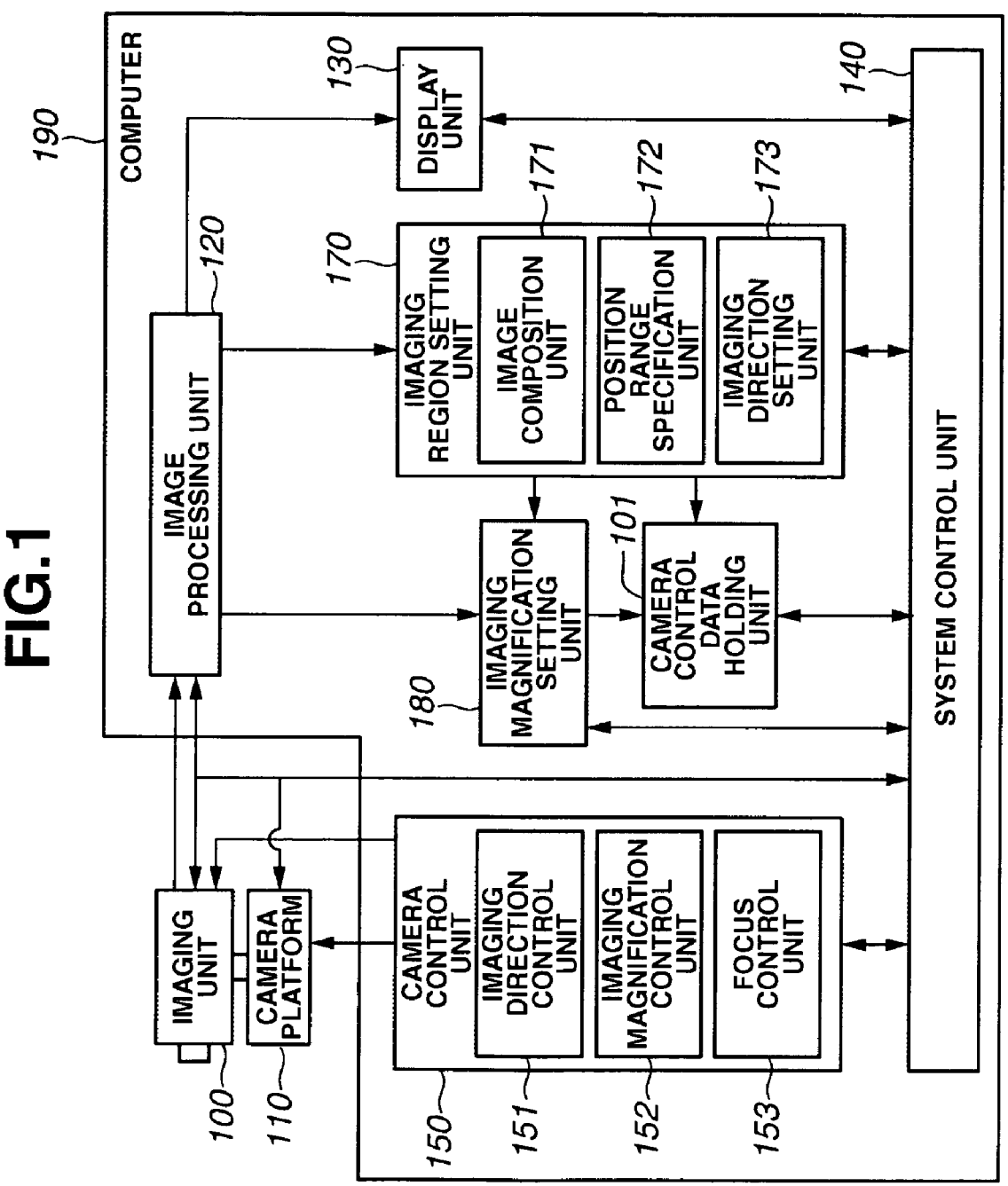
FIG. 1 is a block diagram showing a functional configuration of a system according to a first exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example projector lens assemblies, and reflected light detection devices.

Notice that similar reference numerals and letters refer to similar items in the following figures, and thus once an item is defined in one figure, it may not be discussed for following figures. Exemplary embodiments of the invention will be described in detail below with reference to the drawings.

First Exemplary Embodiment

FIG. 1 is a block diagram showing a functional configuration of a system according to a first exemplary embodiment. As illustrated in FIG. 1, the system according to the first exemplary embodiment includes an imaging unit 100, a camera platform 110, and a computer 190.

The computer 190 includes an image processing unit 120, a display unit 130, a system control unit 140, a camera control unit 150, an imaging region setting unit 170, an imaging magnification setting unit 180, and a camera control data holding unit 101. The camera control unit 150 includes an imaging direction control unit 151, an imaging magnification control unit 152, and a focus control unit 153. The imaging region setting unit 170 includes an image composition unit 171, a position range specification unit 172, and an imaging direction setting unit 173.

The imaging unit 100 includes a lens and an image sensor, (e.g., a CCD, or other image sensor as known by one of ordinary skill in the relevant art and equivalents), and is configured to pick up a moving image and/or a still image in real space. The camera platform 110 includes a motor (not shown). The motor is driven under external control to change an imaging direction of the imaging unit 100 (e.g., in panning and tilting directions).

The image processing unit 120 acquires an image picked up by the imaging unit 100, and can correct or reduce the error in a color, a brightness and so forth of the acquired image. This correction can be a process known by one of ordinary skill in the relevant art, such as a gamma correction, and thus is not described herein. The display unit 130 displays the image corrected by the image processing unit 120. The system control unit 140 controls each unit that constitutes the system.

The camera control unit 150 controls the imaging unit 100 and the camera platform 110. More specifically, the imaging direction control unit 151 controls the driving of the motor included in the camera platform 110. The imaging magnification control unit 152 controls an imaging magnification of the imaging unit 100. The focus control unit 153 controls a focus of the imaging unit 100.

The imaging region setting unit 170 sets a region to be imaged by the imaging unit 100. More specifically, the image composition unit 171 sequentially combines a plurality of images received from the image processing unit 120 to produce one composite image. The position range specification unit 172 specifies a region showing an object desired to be imaged, in the composite image acquired by the image composition unit 171. The imaging direction setting unit 173 sets an imaging direction for imaging the region specified by the position range specification unit 172.

The imaging magnification setting unit 180 sets an imaging magnification for imaging the region set by the imaging region setting unit 170.

The camera control data holding unit 101 holds camera parameters calculated by processes described hereinafter. According to the present exemplary embodiment, the camera parameters include an imaging direction set by the imaging direction setting unit 173 and an imaging magnification set by the imaging magnification setting unit 180.

FIG. 14 is a block diagram showing a hardware configuration associated with the computer 190.

A CPU 1401 controls the computer 190 as a whole by using programs and data stored in a RAM 1402 and/or a ROM 1403, and executes each of hereinafter-described processes to be performed by the computer 190.

The RAM 1402 provides various storage areas, such as an area for temporarily storing the programs and the data loaded from an external storage device 1405, an area for temporarily storing an image picked up by the imaging unit 100 connected to an I/F 1407, and a work area used when the CPU 1401 executes the various processes.

The ROM 1403 can store setting data, a boot program and other items for the computer 190.

An operation unit 1404 includes a keyboard, a mouse, and is configured to input various instructions and data into the CPU 1401.

The external storage device 1405 can be a large-capacity information storage device (e.g., a hard disk drive device). The external storage device 1405 can store an OS (operating system), and the programs, the data and so forth for causing the CPU 1401 to execute each of the hereinafter-described processes. A part or all of the OS, the programs, the data can be loaded on the RAM 1402 according to a control by the CPU 1401 to be processed by the CPU 1401.

A display unit 1406 corresponds to the display unit 130 of FIG. 1, and is configured to display a result of the process by the CPU 1401, (e.g., using an image, a character).

The I/F 1407 is configured to connect the above camera platform 110 and the above imaging unit 100. The computer 190 communicates data with the camera platform 110 and the imaging unit 100 via the I/F 1407.

A bus 1409 connects the above units.

Next, operations of the system including the above configuration will be described. The operations of the system according to the present exemplary embodiment include two main operations.

The first operation is an operation to pick up and acquire an image in real space, and when a region showing an object desired to be imaged also hereafter is determined in the acquired image, to determine and hold the imaging direction and the imaging magnification of the imaging unit 100 to image this object also hereafter. Hereinafter, such operation is referred to as a "region setting operation."

The second operation is a normal imaging operation to pick up an image by the imaging unit 100, and to display the image corrected by the image processing unit 120 on a display screen of the display unit 130. Hereinafter, such operation is referred to as a "normal imaging operation."

Figure 2:
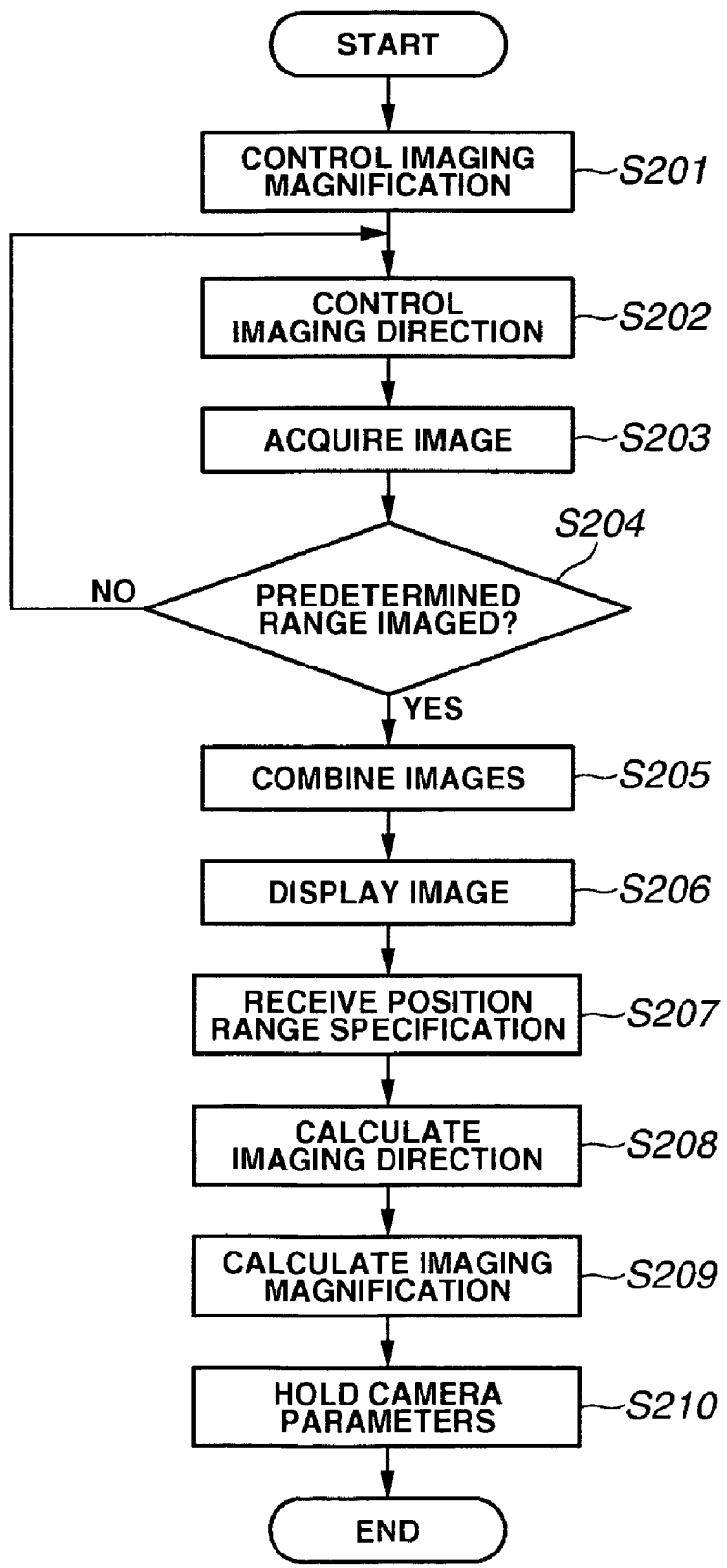
FIG. 2 is a flowchart showing a procedure for setting a region according to the first exemplary embodiment.

First, the region setting operation will be described. FIG. 2 is a flowchart of processes to be performed by the computer 190 when the system according to the present exemplary embodiment performs the region setting operation.

A program and data for causing the CPU 1401 to execute the processes according to the flowchart of FIG. 2 can be stored in the external storage device 1405, and can be loaded on the RAM 1402 according to the control by the CPU 1401. The CPU 1401 can be configured to execute the processes using the program and the data. The computer 190 is thus configured to perform each of the processes described hereinafter.

First, the imaging magnification control unit 152 controls the imaging magnification of the imaging unit 100 to be a predetermined magnification (step S201). For example, the imaging magnification is minimized so that a wide angle image can be picked up.

Next, the imaging direction control unit 151 controls the driving of the motor of the camera platform 110 to control the imaging direction of the imaging unit 100 in a desired direction (step S202). The process performed in this step will be described in detail hereinafter.

Next, imaging of real space is started by the imaging unit 100 with the imaging magnification and the imaging direction set as described above, and the image is input into the RAM 1402 via the I/F 1407 as data. The image processing unit 120 performs various correction or error reducing processes, such as a color correction process, to this image (step S203). Thus, one image picked up by the imaging unit 100 can be acquired in the RAM 1402. The corrected image can also be displayed on the display screen of the display unit 1406.

Next, the CPU 1401 determines whether the imaging unit 100 has completed imaging in each of the panning and tilting directions within a predetermined range, e.g., a maximum range in which the camera platform 110 is movable in each of the panning and tilting directions (step S204). When the imaging unit 100 has not completed imaging as above, the process returns to step S202, in which the imaging direction is shifted. Then, the real space is imaged, and the image is reduced, and is held in the RAM 1402. Thus, the images are picked up with the same imaging magnification in the respective directions within the predetermined range, and each of the picked up images is reduced, and is acquired in the RAM 1402.

This process is described more specifically below. In the following description, the predetermined range in the panning direction is $Pa \leq P \leq Pb$ (P is a panning angle; Pa and Pb are minimum and maximum values of the panning angle of the camera platform 110, respectively), and the predetermined range of the tilting direction is $Ta \leq T \leq Tb$ (T is a tilting angle; Ta and Tb are minimum and maximum values of the tilting angle of the camera platform 110, respectively). First, in step S202, the imaging direction control unit 151 outputs a control signal to the camera platform 110 so that the panning angle of the imaging unit 100 becomes Pa, and the tilting angle thereof becomes Ta. The camera platform 110 controls the panning angle of the imaging unit 100 to become Pa and the tilting angle thereof to become Ta according to the control signal. Then, in step S203, the image picked up in this condition is corrected or the error reduced and is acquired in the RAM 1402.

Then, the process returns to step S202, in which the panning angle P is updated to (Pa+Δp), and the imaging direction control unit 151 outputs a control signal to the camera platform 110 so that the panning angle of the imaging unit 100 becomes (Pa+Δp), and the tilting angle thereof becomes Ta. The camera platform 110 controls the panning angle of the imaging unit 100 to become (Pa+Δp) and the tilting angle thereof to become Ta according to the control signal. Then, in step S203, the image picked up in this condition is reduced and is acquired in the RAM 1402.

Then, such processes are continued until P becomes Pb (P=Pb). When P becomes Pb (P=Pb), the CPU 1401 updates P to Pa, and also updates T to (Ta+Δt). The imaging direction control unit 151 outputs a control signal to the camera platform 110 so that the panning angle of the imaging unit 100 becomes Pa, and the tilting angle thereof becomes (Ta+Δt). The camera platform 110 controls the panning angle of the imaging unit 100 to become Pa and the tilting angle thereof to become (Ta+Δt) according to the control signal. Then, in step S203, the image picked up in this condition is corrected and is acquired in the RAM 1402.

Then, such processes are repeated until T becomes Tb (T=Tb). According to the above process, when the imaging magnification controlled in step S201 is minimized, and the predetermined range is set at the maximum range in which the camera platform 110 is movable in each of the panning and tilting directions, divided images are picked up from the maximum range that can be imaged when the imaging unit 100 and the camera platform 110 are used.

FIG. 3A is a diagram showing an image group acquired while the panning angle and the tilting angle of the imaging unit 100 are being updated. As illustrated in FIG. 3A, images 300-314 (each of the images can be hereinafter referred to as "divided image") are an image group acquired by imaging a region of a real space while the panning angle and the tilting angle of the imaging unit 100 are being changed. The adjacent images (e.g., the image 300, the image 301, and the image 305) have regions overlapped with one another (e.g., 300a). That is, the above Δp and Δt can be determined such that the adjacent images have regions overlapped with one another.

Next, referring back to FIG. 2, when the CPU 1401 detects in step S204 that a predetermined number of images have been picked up (i.e., P becomes Pb (P=Pb) and T becomes Tb (T=Tb) in the above example), the CPU 1401 advances the process to step S205. In this step, the CPU 1401 functions as the image composition unit 171, and executes a process of combining a plurality of images acquired in the RAM 1402 into one image (step S205). FIG. 3B is a diagram showing one image 320 combined from the images 300-314.

Conventionally such composition technology is referred to as a panorama composition technology which combines a plurality of images picked up by a digital camera, to produce a high resolution image. Especially, according to the present exemplary embodiment, the images are picked up without a change in focal length, and basically without a shift of viewpoint. Further, the images are picked up with the known imaging directions. Accordingly, an angle formed by a normal vector of the composite image and a normal vector of each of the divided images is used as an angle of rotation for transforming each of the divided images, and each of the divided images is subjected to a rotational transform. Alternatively, a composite image can be produced by transforming each of coordinates in the composite image using its angle, and calculating a pixel value in a divided image that corresponds to the transformed coordinate by an interpolation process.

Such image composition technology is disclosed in "'Computer Vision: Technological Review and Future Perspective' edited by Takashi Matsuyama, et al.; New Technology Communication, Inc." and "Journal of Institute of Electronics, Information and Communication Engineers D-II Vol. J81-D-II No. 6 pp. 1182-1193 'Viewpoint Fixed Type Pan Tilt Zoom Camera and its Application' Toshikazu Wada, et al."

With whatever technology, a wide-range image (composite image) can be acquired through the processes to step S205. A method for acquiring such image is not limited thereto. Besides, for use in processes of step S206 and after, such a wide-range image can also be stored beforehand in the external storage device 1405, and can be loaded on the RAM 1402 as needed.

Next, referring back to FIG. 2, the composite image acquired as above is displayed on the display screen of the display unit 1406 (step S206). When the composite image is displayed, a resolution of the composite image is converted to suit a resolution of the display unit 1406. However, when the resolution of the composite image differs greatly from the resolution of the display unit 1406, a quality of the composite image can degrades substantially. For this reason, a part of the composite image can be clipped and displayed, and a display area of the composite image can be changed using a GUI (Graphical User Interface) displayed on the display unit 1406.

Next, by using the operation unit 1404, an operator of the computer 190 can specify a position and a range of a region showing an object to be imaged by the imaging unit 100 in normal imaging, in the composite image displayed on the display unit 1406. The CPU 1401 functions as the position range specification unit 172, and receives this specification (step S207). A method for specifying the region is not particularly limited; for example, a desired region (a region showing an object to be imaged by the imaging unit 100 in normal imaging) can be selected using a mouse. Thereby, both the position (e.g., a center position of the selected region) and the range (e.g., a size of the selected region) to be imaged can be specified.

Then, when the position and the range to be imaged are specified, position data of the specified region (e.g., center position data of the specified region) in the composite image, and data of vertical and horizontal size of the specified region can be stored temporarily in the RAM 1402.

Thus, whole of the predetermined range that can be imaged using the imaging unit 100 and the camera platform 110 is displayed, and a region is selected from the displayed range using a pointing device. Thereby, the region to be imaged by the imaging unit 100 in normal imaging can be set easily.

FIG. 3C is a diagram showing regions specified in step S207 in the image 320 shown in FIG. 3B. In FIG. 3C, regions 330-332 are specified in the image 320. However, the number of regions to be specified is not limited thereto. Hereinafter, for ease of description, it is assumed that only the region 330 is specified. When a plurality of regions are specified, processes described below can be performed for each of the regions.

Next, referring back to FIG. 2, the CPU 1401 can function as the imaging direction setting unit 173, and can calculate a direction in which the imaging unit 100 is arranged to image for normal imaging, e.g., a direction in which the imaging unit 100 is to be aimed at the object to be imaged by the imaging unit 100 in normal imaging (step S208). The process in step S208 is described in detail with reference to FIG. 4.

FIG. 4 is a diagram for explaining the process for calculating a direction in which the imaging unit 100 is to be aimed to image the region 330 for normal imaging. In FIG. 4, reference numeral 401 indicates a composite image plane, and the region 330 exists on this image plane 401, as a matter of course. Character reference O indicates the viewpoint of an imaging system, character reference f indicates the focal length, character reference Rp indicates the range of the region 330 (i.e., the size of the region specified in step S207), character reference Ro indicates the center position of the region 330 (i.e., the center position of the region specified in step S207), character reference Dp indicates a distance between the center position Ro of the region 330 and an image center position (e.g., a center position of the composite image) on the image plane 401, and character reference θ indicates an angle of a straight line connecting the viewpoint O and the center Ro of the region 330, with respect to a straight line connecting the viewpoint O and the image center. FIG. 4 shows only one axial direction (the panning direction) of the imaging direction for ease of description.

In order to image the region 330 for normal imaging, an optical axis of the imaging unit 100 can be rotated only by the angle θ toward the center Ro of the region 330, and the imaging magnification can be set such that the range Rp of the region 330 is imaged as substantially the whole image. That is, the angle θ can be an imaging direction (in the panning direction) for imaging the region 330 relative to the imaging direction for the composite image.

Therefore, in step S208, the angle θ is calculated for each of the panning direction and the tilting direction according to an expression (1) below.

$$|\theta|=\arctan(Dp/f) \quad (1)$$

The above Dp is calculated by (length equivalent to one pixel in the composite image plane 401)*(number of pixels). Here, (length equivalent to one pixel in the composite image plane 401) can be obtained by conventional methods using the information, such as the focal length and the transform coefficients, used in the composition process in step S205. Also, (number of pixels) can be obtained by calculating an absolute value of a difference between a coordinate value of the image center and a center coordinate value of the region 330. Thus, Dp can be calculated.

Besides, in the expression (1), the focal length f set beforehand for the imaging unit 100 can be used.

The imaging direction (i.e., the panning angle, the tilting angle) can be calculated by the above process.

Next, referring back to FIG. 2, the CPU 1401 can function as the imaging magnification setting unit 180, and calculates the imaging magnification used by the imaging unit 100 to image the region 330 for normal imaging (step S209).

In order that the range Rp of the region 330 shown in FIG. 4 be imaged as substantially the whole image in normal imaging, the range Rp of the region 330 can be imaged with the imaging magnification of Nn/Nrp relative to the composite image, if the composite image and the image to be picked up in normal imaging can have the same resolution. Here, Nn is a number of pixels in the image in a horizontal direction in normal imaging, and Nrp is a number of pixels in the range Rp of the region 330. Besides, in consideration of the rotation only by the angle θ, the imaging magnification can be set at Nn/(Nrp/cos θ). If the resolution differs, the imaging magnification can be multiplied by a coefficient.

Thus, the imaging magnification can be calculated. As mentioned above, when a plurality of regions are specified in step S207, the processes in step S208 and S209 can be performed for each of the specified regions.

Then, data that represents the imaging direction (i.e., data of the panning angle and data of the tilting angle), and data that represents the imaging magnification which are calculated as above are stored temporarily in the RAM 1402, or are stored in the external storage device 1405, as the camera parameters (step S210).

Thus, the direction in which the imaging unit 100 is to be aimed at the object included in the region 330 (i.e., the imaging direction), and the imaging magnification for imaging this object as substantially the whole image in normal imaging, can be calculated.

Next, when the above processes are completed, and an instruction for the normal imaging operation is input using the operation unit 1404, the CPU 1401 can detect this instruction, and executes processes for the normal imaging operation. The processes for the normal imaging operation can also be configured to be executed immediately after the processes according to the flowchart of FIG. 2 are completed.

Figure 5:
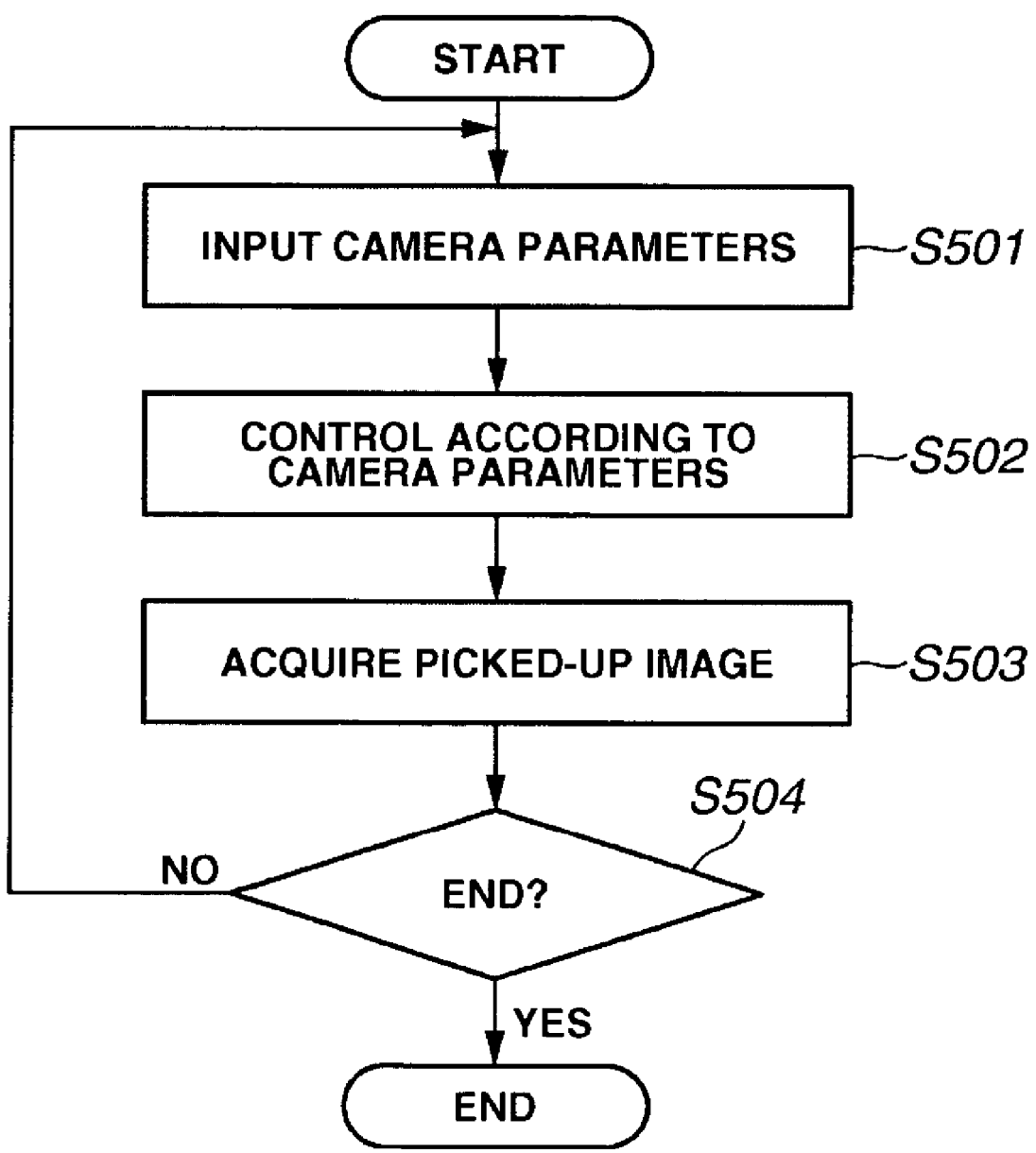
FIG. 5 is a flowchart showing a procedure of a normal imaging operation.

FIG. 5 is a flowchart of the processes to be performed by the computer 190 for the normal imaging operation. A program and data for causing the CPU 1401 to execute the processes according to the flowchart of FIG. 5 can be stored in the external storage device 1405, and can be loaded on the RAM 1402 according to the control by the CPU 1401. The CPU 1401 can be configured to execute the processes using the program and the data. The computer 190 is thus configured to perform each of the processes described hereinafter.

First, when the camera parameters calculated by the processes according to the flowchart of FIG. 2 are stored in the external storage device 1405, the camera parameters are loaded on the RAM 1402 (step S501). When the camera parameters are stored temporarily in the RAM 1402, the process in step S501 is omitted.

Next, the camera control unit 150 sets the imaging direction of the imaging unit 100 and the imaging magnification to the calculated values according to the camera parameters (step S502). More specifically, the imaging direction control unit 151 controls the driving of the motor (not shown) included in the camera platform 110 according to the data that represents the imaging direction included in the camera parameters. Thus, the imaging direction control unit 151 can aim the imaging unit 100 in the calculated imaging direction.

The imaging magnification control unit 152 sets the imaging unit 100 at the calculated imaging magnification according to the data that represents the imaging magnification included in the camera parameters.

The focus control unit 153 controls the camera focus.

Next, when the imaging unit 100 starts picking up an imaging, the CPU 1401 can function as the image processing unit 120, acquiring the picked-up image via the I/F 1407, and can perform each of the above correction or error reduction processes to the thus acquired picked-up image, and displays the corrected image on the display screen of the display unit 1406 (step S503). The corrected image can also be output to an external display device, an external storage device, an external terminal device, via a network.

When the corrected image is output to the external terminal device, the processes described as above (the processes according to the flowchart of FIG. 2) can be executed further in the external terminal device.

Then, when the CPU 1401 detects that an instruction for ending the processes has been input from the operation unit 1404, the CPU 1401 ends the processes. When the CPU 1401 does not detect an input of the instruction, the CPU 1401 repeats the processes of step S501 and subsequent steps.

As described above, according to the present exemplary embodiment, the imaging direction and the imaging magnification for imaging an object to be imaged are set according to a region specified on the composite image by a user. Thus, the user can select the region while visually checking the object to be imaged. Further, the user only has to select the region; then, the imaging direction and the imaging magnification are calculated by the computer 190. Thus, the imaging direction and the imaging magnification for imaging the object to be imaged can be set easily.

Second Exemplary Embodiment

Figure 6:
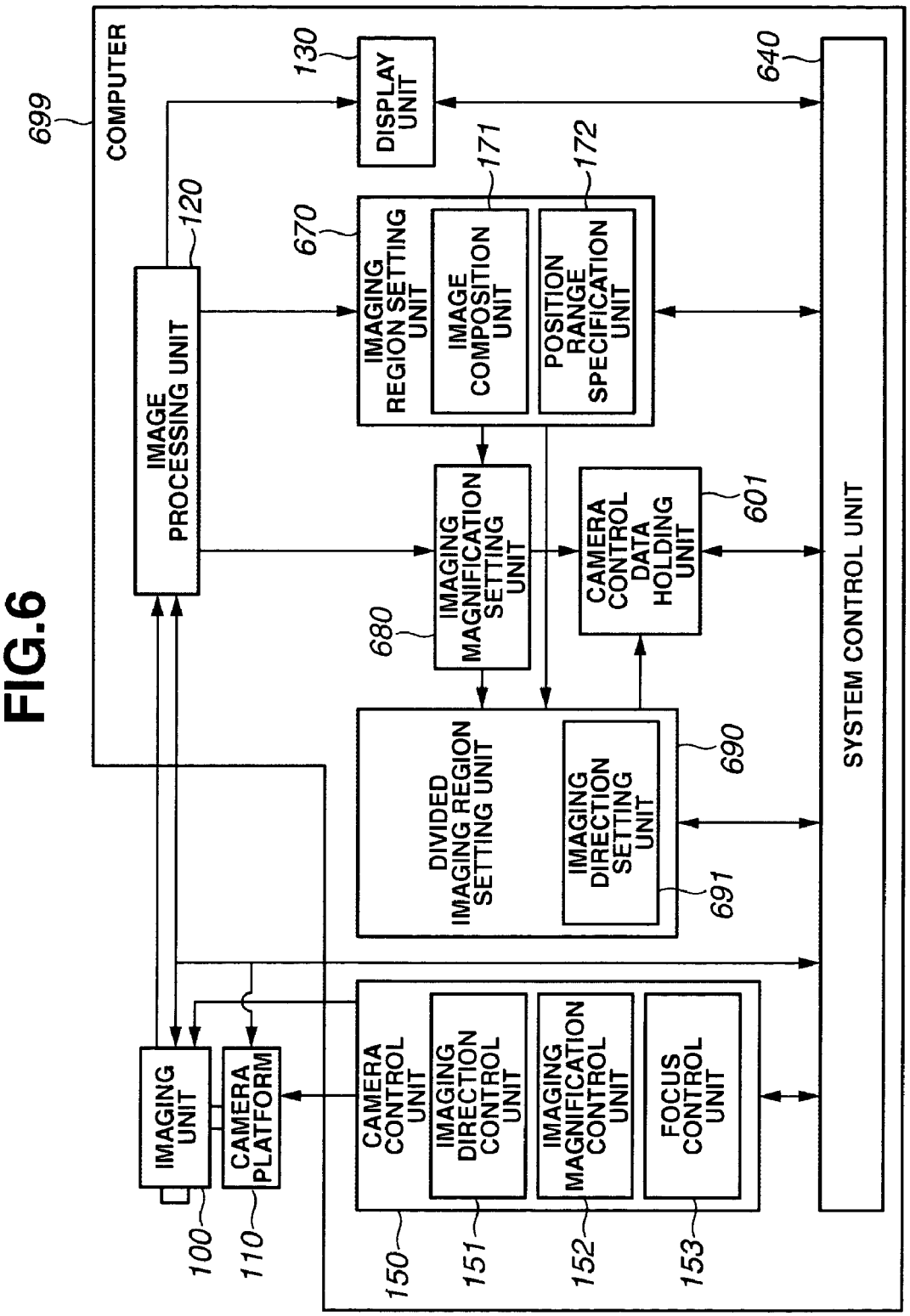
FIG. 6 is a block diagram showing a functional configuration of a system according to a second exemplary embodiment.

FIG. 6 is a block diagram showing a functional configuration of a system according to a second exemplary embodiment. Constituent parts in FIG. 6 that are identical or equivalent to the constituent parts shown in FIG. 1 are indicated by the same reference numerals, and will not be repeated in the following description. As illustrated in FIG. 6, the system according to the second exemplary embodiment includes the imaging unit 100, the camera platform 110, and a computer 699.

The computer 699 includes the image processing unit 120, the display unit 130, a system control unit 640, the camera control unit 150, an imaging region setting unit 670, an imaging magnification setting unit 680, a divided imaging region setting unit 690, and a camera control data holding unit 601. The imaging region setting unit 170 includes the image composition unit 171 and the position range specification unit 172. The divided imaging region setting unit 690 includes an imaging direction setting unit 691.

Only the constituent parts different from the constituent parts shown in FIG. 1 will be described in the following description. The system control unit 640 controls each of the units that constitute the computer 699. The imaging region setting unit 670 sets a region to be imaged by the imaging unit 100. More specifically, the image composition unit 171 and the position range specification unit 172 that constitute the imaging region setting unit 670 perform the above processes. The imaging magnification setting unit 680 sets an imaging magnification for imaging the region set by the imaging region setting unit 670.

The divided imaging region setting unit 690 sets divided regions when the region specified by the position range specification unit 172 is to be imaged with the imaging magnification set by the imaging magnification setting unit 680. The imaging direction setting unit 691 sets an imaging direction for imaging each of the divided regions set by the divided imaging region setting unit 690.

The camera control data holding unit 601 holds camera parameters calculated by processes described hereinafter. According to the present exemplary embodiment, the camera parameters include the imaging direction set by the imaging direction setting unit 691 and the imaging magnification set by the imaging magnification setting unit 680.

The computer 699 has the hardware configuration of FIG. 14, as in the first exemplary embodiment.

Figure 7:
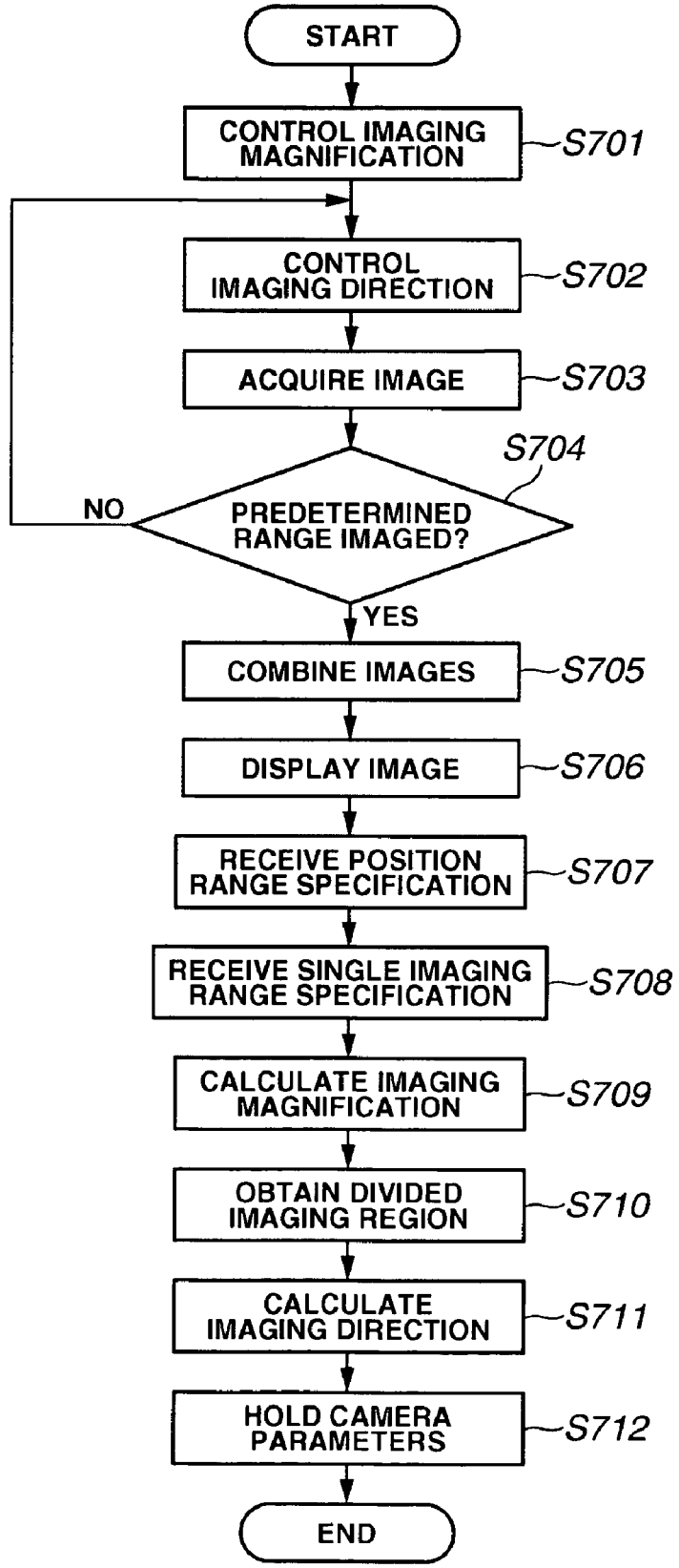
FIG. 7 is a flowchart showing a procedure for setting a region according to the second exemplary embodiment.

FIG. 7 is a flowchart of processes to be performed by the computer 699 when the system according to the present exemplary embodiment performs the region setting operation. A program and data for causing the CPU 1401 to execute the processes according to the flowchart of FIG. 7 can be stored in the external storage device 1405. The program and data can be loaded on the RAM 1402 according to the control by the CPU 1401. The CPU 1401 is configured to execute the processes using the program and the data. The computer 699 is thus configured to perform each of the processes described hereinafter.

First, processes in steps S701-S706 are the same as in steps S201-S206 of FIG. 2, and will not be repeated in the following description.

Next, by using the operation unit 1404, an operator of the computer 699 specifies a position and a range of a region showing an object to be imaged by the imaging unit 100 in normal imaging, in the composite image displayed on the display unit 1406. The CPU 1401 can function as the position range specification unit 172, and can receive this specification (step S707). A method for specifying the region is not particularly limited; for example, a desired region (a region showing an object to be imaged by the imaging unit 100 in normal imaging) can be selected using the mouse. Thereby, both the position (e.g., a center position of the selected region) and the range (e.g., a size of the selected region) to be imaged can be specified.

The present exemplary embodiment differs from the first exemplary embodiment in specifying the region as follows. In the first exemplary embodiment, even when a plurality of regions are specified as illustrated in FIG. 3C, each of the regions can be imaged at one time. However, according to the present exemplary embodiment, a region of such a size that cannot be imaged at one time (e.g., a wide-range region that cannot be imaged at one time) can be specified.

FIG. 8A is a diagram showing an example in which a region 801 is specified in the image 320 shown in FIG. 3B that has such a size which cannot be imaged at one time.

Next, referring back to FIG. 7, the operator of the computer 699 can set a region that can be imaged at one time, within the region specified in step S707 in the composite image displayed on the display unit 1406. The CPU 1401 can function as the position range specification unit 172, and receives this setting (step S708). A method for setting the region is the same as the method for specifying the region in step S707. FIG. 8B is a diagram showing a region 802 set in step S708 within the region 801.

Next, referring back to FIG. 7, the CPU 1401 can function as the imaging magnification setting unit 680, and can calculate the imaging magnification used by the imaging unit 100 in normal imaging to image the region set in step S708 (step S709). A method for calculating the magnification can be the same as in the first exemplary embodiment.

Next, the CPU 1401 can function as the divided imaging region setting unit 690, and can divide the region specified in step S707 into regions of the size set in step S708 (step S710). A method for dividing the region is not particularly limited; for example, divided regions are overlapped from the position of the region set in step S708 with a predetermined overlap quantity until the overlapped divided regions equal the region specified in step S707. In this course, if peripheral divided regions cross over the region specified in step S707 by a predetermined value (e.g., half the divided region) or more, the overlap quantity can be adjusted, and the divided regions can be overlapped again with the adjusted overlap quantity.

FIG. 8C is a diagram showing a result of the division of the region 801 (corresponding to the region specified in step S707) into divided regions of the same size as the region 802 (corresponding to the region set in step S708).

Next, referring back to FIG. 7, each of the divided regions is subjected to a process of calculating a direction in which the imaging unit 100 is to be aimed when the imaging unit 100 images the divided regions in normal imaging (step S711). That is, when there are N divided regions, the imaging direction is calculated for each of the divided regions, such as the imaging direction for imaging a divided region 1, the imaging direction for imaging a divided region 2, . . . , and the imaging direction for imaging a divided region N. A method for calculating the imaging direction can be the same as in the first exemplary embodiment.

Then, data that represents the imaging magnification calculated in step S709, and data that represents the imaging direction calculated for each of the divided regions in step S711 (e.g., data of the panning angle and data of the tilting angle) can be stored temporarily in the RAM 1402 as the camera parameters. Alternatively, the data that represents the imaging magnification, and the data that represents the imaging direction can be stored in the external storage device 1405 as the camera parameters (step S712).

Next, when the above processes are completed, and an instruction for the normal imaging operation is input using the operation unit 1404, the CPU 1401 detects this instruction, and executes the processes for the normal imaging operation. The processes for the normal imaging operation can also be configured to be executed immediately after the processes according to the flowchart of FIG. 7 are completed. The processes to be performed by the computer 699 for the normal imaging operation are similar to the first exemplary embodiment, and thus are not described here.

According to the present exemplary embodiment, in step S708, the operator of the computer 699 sets a region that can be imaged at one time. However, the region that can be imaged at one time can also be set by the computer 699 according to a size that can be imaged at one time. Besides, the region set by the computer 699 can also be displayed so that the operator can change the region as needed.

Further, according to the present exemplary embodiment, a region of a size that cannot be imaged at one time is specified in step S707. Here, it can also be judged whether or not the specified region can be imaged at one time. Then, when the specified region cannot be imaged at one time, step S708 and after can be executed. When the specified region can be imaged at one time, step S208 and after in the first exemplary embodiment can be executed.

Third Exemplary Embodiment

Figure 9:
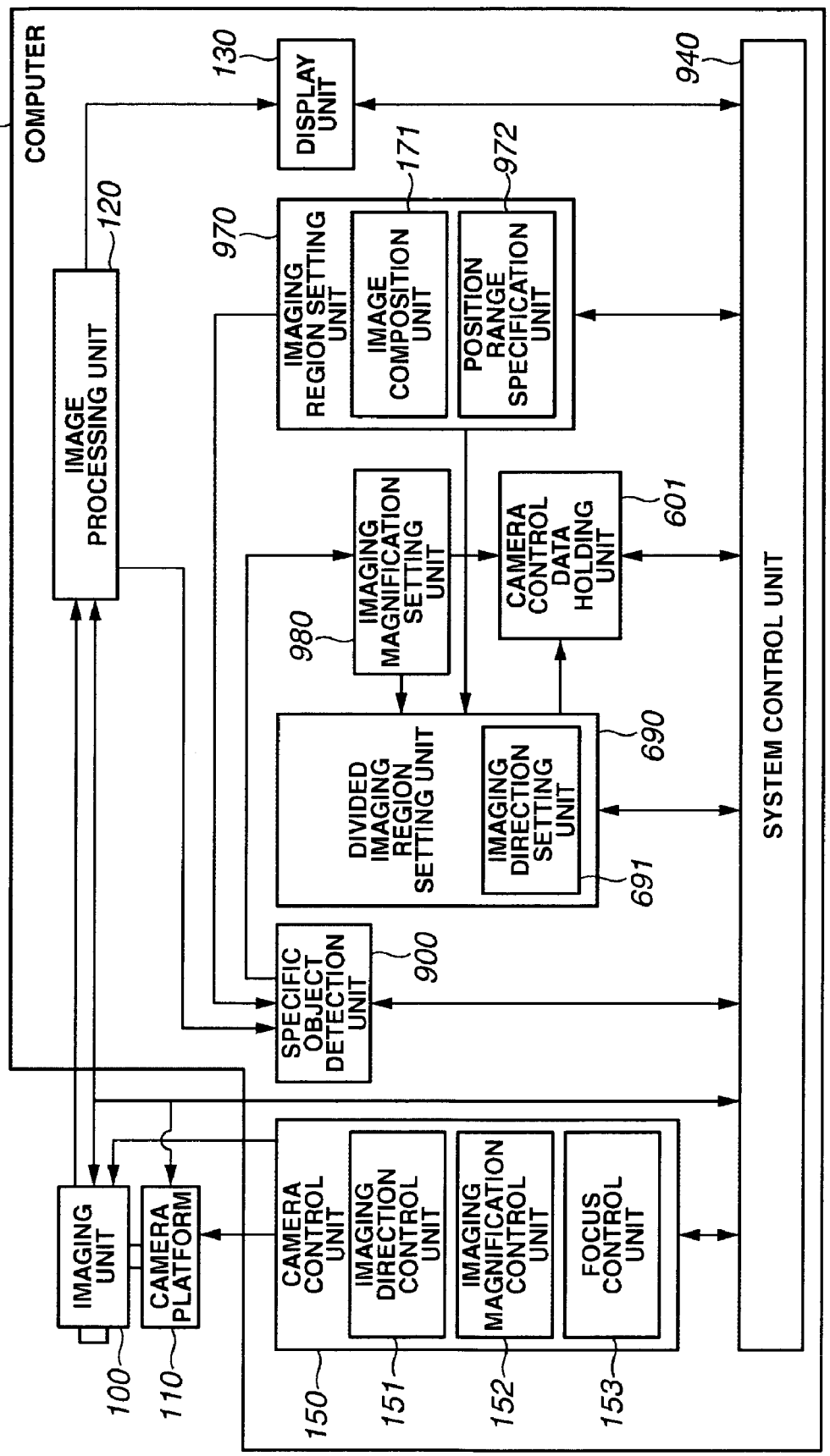
FIG. 9 is a block diagram showing a functional configuration of a system according to a third exemplary embodiment.

FIG. 9 is a block diagram showing a functional configuration of a system according to a third exemplary embodiment. Constituent parts in FIG. 9 that are identical or equivalent to the constituent parts shown in FIGS. 1 and 6 are indicated by the same reference marks, and will not be repeated in the following description. As illustrated in FIG. 9, the system according to the third exemplary embodiment includes the imaging unit 100, the camera platform 110, and a computer 999.

The computer 999 includes the image processing unit 120, the display unit 130, a system control unit 940, the camera control unit 150, an imaging region setting unit 970, an imaging magnification setting unit 980, the divided imaging region setting unit 690, a specific object detection unit 900, and the camera control data holding unit 601. The imaging region setting unit 170 includes the image composition unit 171 and a position range specification unit 972.

Only the constituent parts different from the constituent parts shown in FIG. 1 will be described in the following description. The system control unit 940 controls each of the units that constitute the computer 999. The imaging region setting unit 970 sets a region to be imaged by the imaging unit 100. The computer 999 according to the present exemplary embodiment differs from the computer 699 according to the second exemplary embodiment mainly in that the computer 999 according to the present exemplary embodiment includes the specific object detection unit 900.

The specific object detection unit 900 is configured to detect a specific object from an image picked up by the imaging unit 100. For example, in a monitoring system, it can be useful to detect an intrusion of a specific object. Accordingly, an imaging magnification can be used in imaging with which the specific object can be detected. Therefore, according to the present exemplary embodiment, when the imaging region is set, the specific object detection unit 900 is used to detect the specific object in the image picked up by the imaging unit 100, and the imaging magnification is set such that the specific object can have a predetermined size in the image.

A technique for detecting the specific object is not particularly limited, and various methods, such as a template matching, are generally used as the technique for detecting the specific object. Here, a case where the specific object is a human face is described as an example.

In the following description, a human face is used as the specific object. However, it is to be clearly understood from the following description that substance of the following description is not limited thereto.

Figure 10:
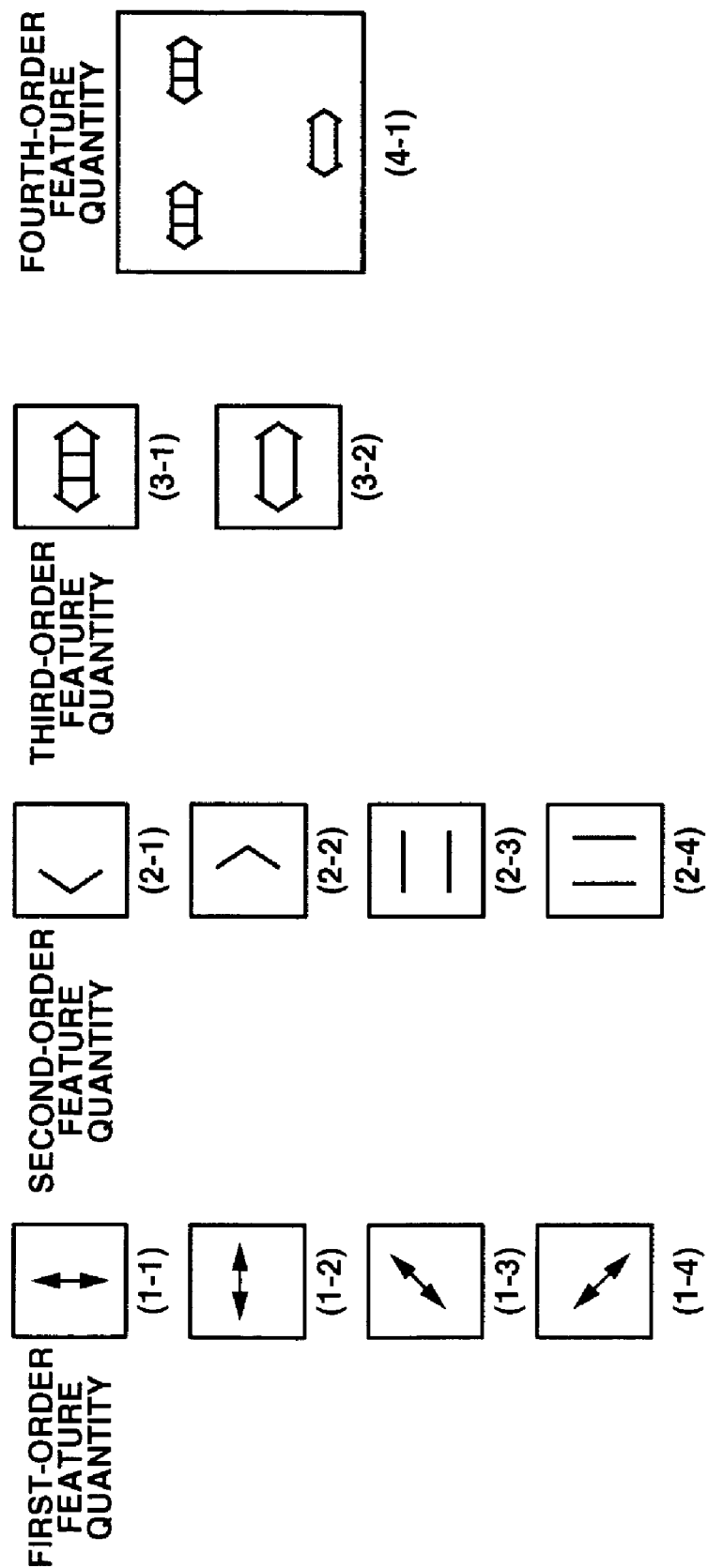
FIG. 10 is a diagram showing a process of detecting a face in an image by hierarchical processing.

FIG. 10 is a diagram showing a process of detecting a face in an image by hierarchical processing. In this process, local features are detected in one hierarchical level, results of the detection are integrated, and a more complicated local feature is detected in a next hierarchical level. This process is repeated to eventually detect the face which is an object. That is, first-order features which are primitive feature are detected first, and second-order features are detected using results of the detection (detection levels and positional relationships) of the first-order features. Then, third-order features are detected using results of the detection of the second-order features, and finally, a face which is a fourth-order feature is detected using results of the detection of the third-order features.

First, first-order feature quantities, such as a vertical feature (1-1), a horizontal feature (1-2), a diagonally right-up feature (1-3), and a diagonally right-down feature (1-4), are detected. Here, the vertical feature (1-1) represents an edge segment in a vertical direction (the same applies hereinafter). The result of the detection is output for each feature in a form of a detection result image of a size equivalent to an input image. Accordingly, four types of detection result images can be acquired in this example. Then, according to a value at each position of the detection result image for each feature, it can be determined whether or not each feature is present at the position in the input image.

Next, a rightward-opening V-shaped feature (2-1), a leftward-opening V-shaped feature (2-2), a horizontal parallel-lines feature (2-3) or a vertical parallel-lines feature (2-4) are detected as second-order feature quantities. The rightward-opening V-shaped feature (2-1) is detected from the diagonally right-up feature (1-3) and the diagonally right-down feature (1-4). The leftward-opening V-shaped feature (2-2) is detected from the diagonally right-down feature (1-4) and the diagonally right-up feature (1-3). The horizontal parallel-lines feature (2-3) is detected from the horizontal feature (1-2). The vertical parallel-lines feature (2-4) is detected from the vertical feature (1-1).

Further, an eye feature (3-1) and a mouth feature (3-2) are detected as third-order feature quantities. The eye feature (3-1) is detected from the rightward-opening V-shaped feature (2-1), the leftward-opening V-shaped feature (2-2), the horizontal parallel-lines feature (2-3), and the vertical parallel-lines feature (2-4). The mouth feature (3-2) is detected from the rightward-opening V-shaped feature (2-1), the leftward-opening V-shaped feature (2-2), and the horizontal parallel-lines feature (2-3). Then, a face feature (4-1) which is a fourth-order feature quantity is detected from the eye feature (3-1) and the mouth feature (3-2).

The above detection method can also be achieved using a neural network designed to perform an image recognition by parallel hierarchical processing. This technique is described, for example, in "M. Matsugu, K. Mori, et al., 'Convolutional Spiking Neural Network Model for Robust Face Detection,' 2002, International Conference On Neural Information Processing (ICONIP02)."

Figure 11:
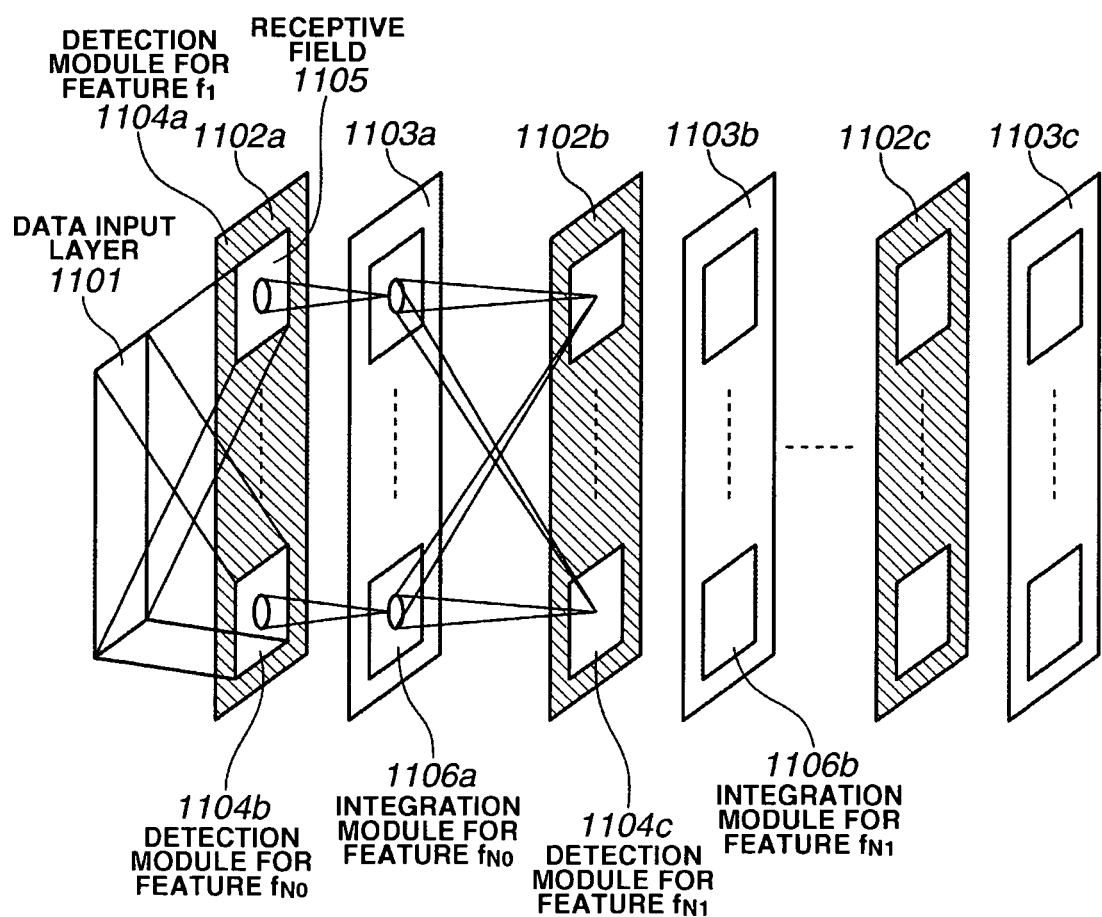
FIG. 11 is a diagram showing a configuration of a neural network designed to perform an image recognition by parallel hierarchical processing.

FIG. 11 is a diagram showing a configuration of a neural network designed to perform an image recognition by parallel hierarchical processing. This neural network is designed to hierarchically treat information concerning recognition (detection) of an object or a geometric feature in a local region in input data. A basic structure of the neural network is a so-called Convolutional Network Structure (LeCun, Y. and Bengio, Y., 1995, "Convolutional Networks for Images Speech, and Time Series" in Handbook of Brain Theory and Neural Networks (M. Arbib, Ed.), MIT Press, see pp. 255-258). In a final layer (i.e., a highest-order layer), a presence or absence of an object desired to be detected, and if it is present, positional information on the input data is obtained.

A data input layer 1101 is a layer configured to input image data. A first feature detection layer 1102a detects local low-order features of an image pattern input from the data input layer 1101. The low-order features can include not only geometric features, such as a specific direction component and a specific spatial frequency component, but also a color component feature. The above detection can be performed in a local region centered on each position on a full screen, or a local region centered on each of predetermined sampling points over the full screen. This detection can be performed for a plurality of feature categories with a plurality of scale levels or resolutions in one part.

A feature integration layer 1103a can have a predetermined receptive field structure, and is configured to integrate a plurality of neuron element outputs within the same receptive field from the feature detection layer (e.g., to perform an operation, such as a subsampling by a local averaging, a maximum output detection). Here, the receptive field refers to a coupling range with output elements of a preceding layer. The receptive field structure refers to a distribution of coupling loads thereof. The above integration process serves to spatially obscure the outputs from the feature detection layer to allow displacement, deformation and so forth. Each of the receptive fields of neurons within the feature integration layer has a common structure among the neurons within the same layer.

Each of succeeding layers performs similar processes as performed by each of the above layers. That is, each of feature detection layers (1102b, 1102c) detects a plurality of different features in each feature detection module, and each of feature integration layers (1103b, 1103c) integrates results of the detection regarding the features from the preceding feature detection layer. In this regard, however, the feature detection layer is coupled (wired) so as to receive cell element outputs of the preceding feature integration layer belonging to the same channel. The subsampling performed in the feature integration layer is a process of performing an averaging, of outputs from a local region (a local receptive field of the concerned feature integration layer neuron) from a feature detection cell population of the same feature category.

The receptive field structure of neurons used for detection in each of the feature detection layers shown in FIG. 11 is configured to be common so that each of the features shown in FIG. 10 can be detected. In a face detection layer which is the final layer, receptive field structures suitable for various sizes and various rotation quantities are provided as receptive field structures used for detecting a face. Accordingly, when a result indicating a presence of the face is obtained in detecting the face feature, face data, such as a size and a direction of the face, can be obtained according to which receptive field structure is used to detect the face.

Further, each of the above receptive fields can be changed to detect not only the face, but also other objects, such as a vehicle.

The specific object detection unit 900 can be configured to perform a specific object detection process by the hierarchical neural network as above, and a method therefor is not particularly limited.

The computer 999 can have the hardware configuration of FIG. 14, as in the first and second exemplary embodiments.

FIG. 12 is a flowchart of processes to be performed by the computer 999 when the system according to the present exemplary embodiment performs the region setting operation. A program and data for causing the CPU 1401 to execute the processes according to the flowchart of FIG. 12 can be stored in the external storage device 1405, and are loaded on the RAM 1402 according to the control by the CPU 1401. The CPU 1401 is configured to execute the processes using the program and the data. The computer 999 is thus configured to perform each of the processes described hereinafter.

First, processes in steps S1201-S1207 are the same as in steps S701-S707 of FIG. 7, and will not be repeated in the following description.

When a region is specified in step S1207, the CPU 1401 functions as the specific object detection unit 900, and executes a process of detecting a specific object within the specified region (step S1208).

FIG. 13A is a diagram showing a human face as an example of the specific object. FIG. 13B is a diagram showing a specific object 1301 detected within a specified region 1300. The process of specifying the region in step S1207 is not necessary, and a specific object can also be detected from the whole composite image.

Next, the CPU 1401 can function as the imaging magnification setting unit 980, and can calculate the imaging magnification such that the specific object detected in step S1208 can be imaged in a predetermined size in the normal imaging operation (step S1209). The size of the object can be calculated, for example, from distances between both eyes and the mouth, since both eyes and the mouth are also detected when the face is detected, as illustrated in FIG. 10. Further, as described with reference to FIG. 11, an approximate size of the face can also be obtained using receptive fields suitable for various sizes. Accordingly, using the method described in the first exemplary embodiment, the imaging magnification can be calculated such that the specific object detected in step S1208 can be imaged in a predetermined size in the normal imaging operation.

FIG. 13C is a diagram showing a region 1302 that can be imaged at one time when the imaging magnification is set such that the detected object can be imaged in a predetermined size.

Processes in steps S1210-S1212 are the same as the processes in steps S710-S712, respectively, and will not be described here.

As described above, according to the present exemplary embodiment, a region to be imaged at one time can be set using an actually detected object. Accordingly, a setting for normal imaging can be performed easily, and an actual detection accuracy also improves.

Other Exemplary Embodiments

A recording medium (or a storage medium) on which a program code of software for achieving the functions according to the above exemplary embodiments can be recorded can also be supplied to a system or device, and the computer (or the CPU or MPU) of the system or the device can read and execute the program code stored in the recording medium. At least one exemplary embodiment can also be achieved thereby. In this case, the program code per se which is read from the recording medium achieves the functions according to the above exemplary embodiments, and the recording medium on which the program code is recorded constitutes at least one exemplary embodiment.

The functions according to the above exemplary embodiments are achieved not only by executing the program code read by the computer. According to directions of the program code, the OS (operating system), that is operating on the computer can perform a part or all of the actual processes. The functions according to the above exemplary embodiments can be achieved also by the processes.

Further, the program code read from the recording medium can be written in a memory provided in a function expansion card inserted in the computer or a function expansion unit connected to the computer. According to the directions of the program code, (e.g., from a CPU), provided in the function expansion card or the function expansion unit can perform a part or all of the actual processes. The functions according to the above exemplary embodiments can also be achieved by the processes.

When at least one exemplary embodiment is applied to the above recording medium, the recording medium stores the program code corresponding to the flowcharts described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-104368 filed Mar. 31, 2005, which is hereby incorporated by reference herein in its entirety.

What is claimed is:

1. An image processing method comprising:
    an imaging step of picking up a plurality of images while changing an imaging direction of a camera;
    a combining step of combining the plurality of images picked up in the imaging step into a single composite image which contains the plurality of images as respective partial images;
    a specifying step of specifying a target region within the composite image; and
    a calculating step of calculating an imaging direction and an imaging magnification, for imaging an object included in the target region in a predetermined size, based on a position and a size of the target region in the composite image and an imaging parameter set for the camera when the plurality of images are picked up,
    wherein the calculating step includes a step of calculating the imaging direction based on a focal length set for the camera and a distance between a center of the composite image and a center of the target region.

2. The image processing method according to claim 1, further comprising a second imaging step of setting the imaging direction and the imaging magnification calculated by the calculating step to the camera to cause the camera to perform imaging.

3. The image processing method according to claim 1, wherein the specifying step includes a step of causing the composite image to be displayed on a display unit and specifying the target region according to an instruction by a user.

4. The image processing method according to claim 1, wherein the imaging step includes a step of picking up the plurality of images with a minimum imaging magnification.

5. The image processing method according to claim 1, wherein the imaging step includes a step of picking up the plurality of images while changing the imaging direction so that a whole range, which can be imaged with the camera, is covered by the plurality of images.

6. The image processing method according to claim 1, wherein the calculating step includes a step of calculating the imaging direction by:

$$\theta = \arctan(Dp/f)$$

where $\theta$ is the imaging direction to be calculated, f is the focal length, and Dp is the distance between the center of the composite image and the center of the target region.

7. The image processing method according to claim 1, wherein the calculating step includes a step of calculating the imaging magnification based on a number of pixels in the composite image in a horizontal direction and a number of pixels in a range of the target region.

8. The image processing method according to claim 7, wherein the calculating step includes a step of calculating the imaging magnification by:

$$SR = Nn/Nrp$$

where SR is the imaging magnification to be calculated, Nn is the number of pixels in the horizontal direction, and Nrp is the number of pixels in the range of the target region.

9. An image processing apparatus comprising:

an imaging control unit adapted to pick up a plurality of images while changing an imaging direction of a camera;

a composition unit adapted to combine the plurality of images picked up by the imaging control unit into a single composite image which contains the plurality of images as respective partial images;

a specification unit adapted to specify a target region within the composite image; and a calculation unit adapted to calculate an imaging direction and an imaging magnification, for imaging an object included in the target region in a predetermined size, based on a position and a size of the target region in the composite image and an imaging parameter set for the camera when the plurality of images are picked up, wherein the calculating unit is adapted to calculate the imaging direction based on a focal length set for the camera and a distance between a center of the composite image and a center of the target region.

10. A computer-readable storage medium storing a program for causing a computer to perform an image processing method comprising:

an imaging step of picking up a plurality of images while changing an imaging direction of a camera;

a combining step of combining the plurality of images picked up in the imaging step into a single composite image which contains the plurality of images as respective partial images;

a specifying step of specifying a target region within the composite image; and a calculating step of calculating an imaging direction and an imaging magnification, for imaging an object included in the target region in a predetermined size, based on a position and a size of the target region in the composite image and an imaging parameter set for the camera when the plurality of images are picked up, wherein the calculating step includes a step of calculating the imaging direction based on a focal length set for the camera and a distance between a center of the composite image and a center of the target region.

* * * * *